US006785880B1

(12) United States Patent
Beisiegel et al.

(10) Patent No.: US 6,785,880 B1
(45) Date of Patent: Aug. 31, 2004

(54) TOOLING FRAMEWORK SYSTEM AND METHOD FOR CODE GENERATION

(75) Inventors: Michael Beisiegel, Boeblingen (DE);
Piotr Przybylski, Toronto (CA);
Norman K. W. Seto, North York (CA);
John W. Stephenson, Oshawa (CA)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 09/626,628

(22) Filed: Jul. 27, 2000

(30) Foreign Application Priority Data

Jul. 29, 1999 (CA) .............................................. 2279118

(51) Int. Cl.⁷ ................................................ G06F 9/44
(52) U.S. Cl. ...................................... 717/106; 717/100
(58) Field of Search ............................... 717/100–109, 717/147, 120–123; 707/100, 200

(56) References Cited

U.S. PATENT DOCUMENTS 6,230,315 B1 * 5/2001 Nicholas ..................... 717/104
6,321,374 B1 * 11/2001 Choy .......................... 717/106
6,339,838 B1 * 1/2002 Weinman, Jr. ............... 717/104
6,370,681 B1 * 4/2002 Dellarocas et al. .......... 717/110
6,427,230 B1 * 7/2002 Goiffon et al. .............. 717/108

OTHER PUBLICATIONS

Fraser et al. Hardening COTS Software with Generic Software Wrappers. IEEE. 1999. pp. 2–16.*
Liu et al. XWRAP: An XML–enabled Wrapper Construction System for Web Information Sources. IEEE. 2000. pp. 611–621.*
Mingins et al. Building Trust in Third–Party Components Using Component Wrappers in the .NET Frameworks. ACM. 2002. pp. 153–157.*

* cited by examiner

*Primary Examiner*—Wei Zhen
(74) *Attorney, Agent, or Firm*—Roy W. Truelson (57) ABSTRACT

The ToolFrame is a code generation tooling framework. Its components form the basis of a generic tooling framework that provides a structured, consistent, and flexible method for developing tools. The ToolFrame separates functionality into components to emphasize substitution of components through common interfaces. This separation is furthered by a common complex object called Resource, used to represent any type of information shared between components.

33 Claims, 10 Drawing Sheets

TOOLING FRAMEWORK SYSTEM AND METHOD FOR CODE GENERATION

TECHNICAL FIELD OF THE INVENTION

This invention pertains to computer code generation. More particularly, it relates to the generation of tools for computing apparatus.

BACKGROUND OF THE INVENTION

Tool development is the process of creating tools that perform a desired task such as generating code from, for example, a markup language such as Extensible Markup Language (XML). Other markup languages include Hyper-Text Markup Language (HTML) and Standard Generalized Markup Language (SGML).

Currently, developers implementing tools do so on an adhoc basis or they adhere to a model that was previously developed. Either way, such tools often have their own implementation for separating functionality, their own definitions for their objects, and their own set of application programming interfaces (APIs) for invocation and for passing data.

The process of developing tools is characterized today by several problems. Among these are (1) inconsistent tooling design, which leads to the development of inconsistent tools that offer the same functionality; (2) difficult intercommunication between various structures representing tooling data; (3) difficult, major changes in design of tools required to substitute functionality between the tools; and (4) inconsistent tooling functionality and separate tooling presentation.

Consequently, there is a need in the art for a tooling framework that can address these problems.

Indeed, there is a need to provide a system and method for tool development having a structured consistent way of developing tools that can ease implementation, that may also provide a common interface whereby various tools can communicate with one another, and that may also provide a tool component which is independent of its environment and tool data.

There is also a need to provide a tool development system and process that facilitates ease of substitution between various tools and components interacting to the tool such as user interface (UI) components, different tools, etc. A graphical user interface (GUI) is an example of a UI component including a set of view, model, and controller objects for handling the collection and display of data to the user.

There is also a need to provide a tool development system and process that allows different structures to be generated as well as to have those structures generated in different programming languages.

SUMMARY OF THE INVENTION

In accordance with the preferred embodiment of the invention, a code generation tooling framework comprises a resource component, a repository component, and a tool component. The tool component has a reference to the resource component and includes code generating objects for generating code from markup language meta data. The repository component has a reference to the resource component and provides a wrapper class enabling the tool component to interact with a current environment selectively for storing, retrieving, and deleting the resource components. The resource component is used to represent information shared between components.

Other features and advantages of this invention will become apparent from the following detailed description of the preferred embodiment of the invention, taken in conjunction with the accompanying drawings.

DETAILED DESCRIPTION

The mechanisms of the preferred embodiment are presented in terms of program procedures and methods executed on a computer or network of computers. A computer may comprise a processor and a memory device and optionally, a storage device, an output device such as a video display, and/or an input device such as a keyboard or computer mouse. Computers may equally be in stand-alone form (such as the traditional desktop personal computer) or integrated into another apparatus (such a cellular telephone). These descriptions and representations of program procedures and methods are commonly used by those skilled in the art to most effectively convey the substance of their work to others skilled in the art. They may be implemented in hardware or software, or a combination of the two.

A program method and/or procedure is here, and generally, conceived to be a sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes, arguments, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. The operations described herein are machine operations and no such capability of a human operator is necessary, or desirable in most cases, in any of the operations which form part of the preferred embodiment. Useful machines for performing the operations of the preferred embodiment include general purpose digital computers or similar devices.

As described above, the preferred embodiment of the present invention involves a code tooling framework. The framework may be implemented in hardware or software, or a combination of the two. Where the framework comprises hardware, such hardware may be specially constructed for the required purposes or it may comprise one or more computers, which may or may not be interconnected, as selectively activated or reconfigured by a computer program stored in the computer(s). The procedures presented herein are not inherently related to a particular computer or other apparatus. Where the framework comprises software, the software programs written in accordance with the teachings herein may be made for general purpose computers, or it may prove more convenient to create software for more specialized hardware. The required structure for the hardware and software will appear from the description that follows.

Each step of the method may be executed on any computer, such as a mainframe computer, personal computer, or the like and pursuant to one or more, or a part of one or more, program modules or objects generated from any programming language, such as C++, Java, Fortran, or the like. And still further, each step, or a file or object or the like implementing each step, may be executed by special purpose hardware or a circuit module designed for that purpose.

In the case of diagrams depicted herein, they are provided by way of example. There may be variations to these diagrams or the steps (or operations) described herein without departing from the spirit of the invention. For instance, in certain cases, the steps may be performed in differing order, or objects, classes and steps may be added, deleted, or modified. These and other variations are possibly part of the present invention.

While the preferred embodiment of this invention is being described in relation to XML and the Java language, the preferred embodiment need not be solely implemented using XML or the Java language. It will be apparent to those skilled in the art that the preferred embodiment may equally be implemented in other computer languages, such as object-oriented languages like Java and Smalltalk and other markup languages such as SGML. In any case, the language may be a compiled or interpreted language.

The preferred embodiment may be implemented as a program storage device readable by a machine, tangibly embodying a program of instructions executable by a machine to perform the method steps of the preferred embodiment, an article of manufacture comprising a computer usable medium having computer readable program code means therein, the computer readable program code means in said computer program product comprising computer readable code means for causing a computer to effect the steps of the preferred embodiment, or a computer program product or computer element for performing the method steps of the preferred embodiment. Such an article of manufacture, program storage device, or computer product or computer program element may include, but is not limited to, CD-ROMs, diskettes, tapes, hard drives, and computer RAM or ROM. Indeed, the article of manufacture or program storage device may be any solid or fluid transmission medium, magnetic or optical, or the like, for storing signals readable by a machine for controlling the operation of a general of special purpose programmable computer according to the method of the preferred embodiment and/or to structure its components in accordance with a system of the preferred embodiment. The preferred embodiment may also be implemented in a system. Moreover, a system may comprise one or more computers which may or may not be an interconnected network of computers.

The ToolFrame is a code generation tooling framework. Its components form the basis of a generic tooling framework that provides a structured, consistent, and flexible method for developing tools. The ToolFrame separates functionality into components to emphasize substitution of components through common interfaces. This separation is furthered by a common complex object called Resource, used to represent any type of information shared between components.

Syntax Summary

The code generation tooling framework of the preferred embodiment of the invention is described with reference to the class diagrams of FIGS. 1, 3, and 4, with reference to the object diagram of FIG. 2, and with reference to the object interaction diagram of FIG. 5.

In a class diagram, (1) an open arrow means "implements," that is, that the entity behind the arrow implements the interface pointed to by the arrow; (2) a closed arrow means there is an object reference relation, that is the pointed to object explicitly knows of the pointing object by way of a hard coded reference; (3) a closed arrow with a diamond at its base means "owns," and represents an aggregation relationship; and (4) a closed arrow with a dotted line also means an object reference relation, but it is one of an implicit reference from the pointed to object with the object pointing to it. For a more complete description of the constructs for FIGS. 1 and 3, see Erich Gamma, et al., *Design Patterns, Elements of Reusable Object Oriented Software*, Addison-Wesley, copyright 1995. The constructs for FIGS. 2 and 4 vary somewhat from Gamma, et al., as herein described.

Thus, that open arrow 101 implements an interface 140 means that the object 100 that implements the interface 140 implements all of the methods 141 described in the interface 140. A closed arrow has a known, explicit reference of another object and there is an object reference relation. The arrow indicates the object referenced. A closed arrow may mean that an object invokes a method on a resource object. A closed arrow 191 with a diamond at its base means that object 105 owns Builder object 182. Owning an object means there exists an aggregation relationship in which an object owns or is responsible for the object to which it points. As a corollary, the object 182 pointed to is part of the object 105 pointing to it. A closed arrow 187 with a dotted line reference indicates an implicit, or a weak, reference from the pointed to object 184 with the object 105 pointing to it. This weak reference is in the form that object 184 is being used by the object 105 pointing to it through argument passing. It may be interpreted to have the same meaning as a closed arrow without a dotted line.

Figure 2A:
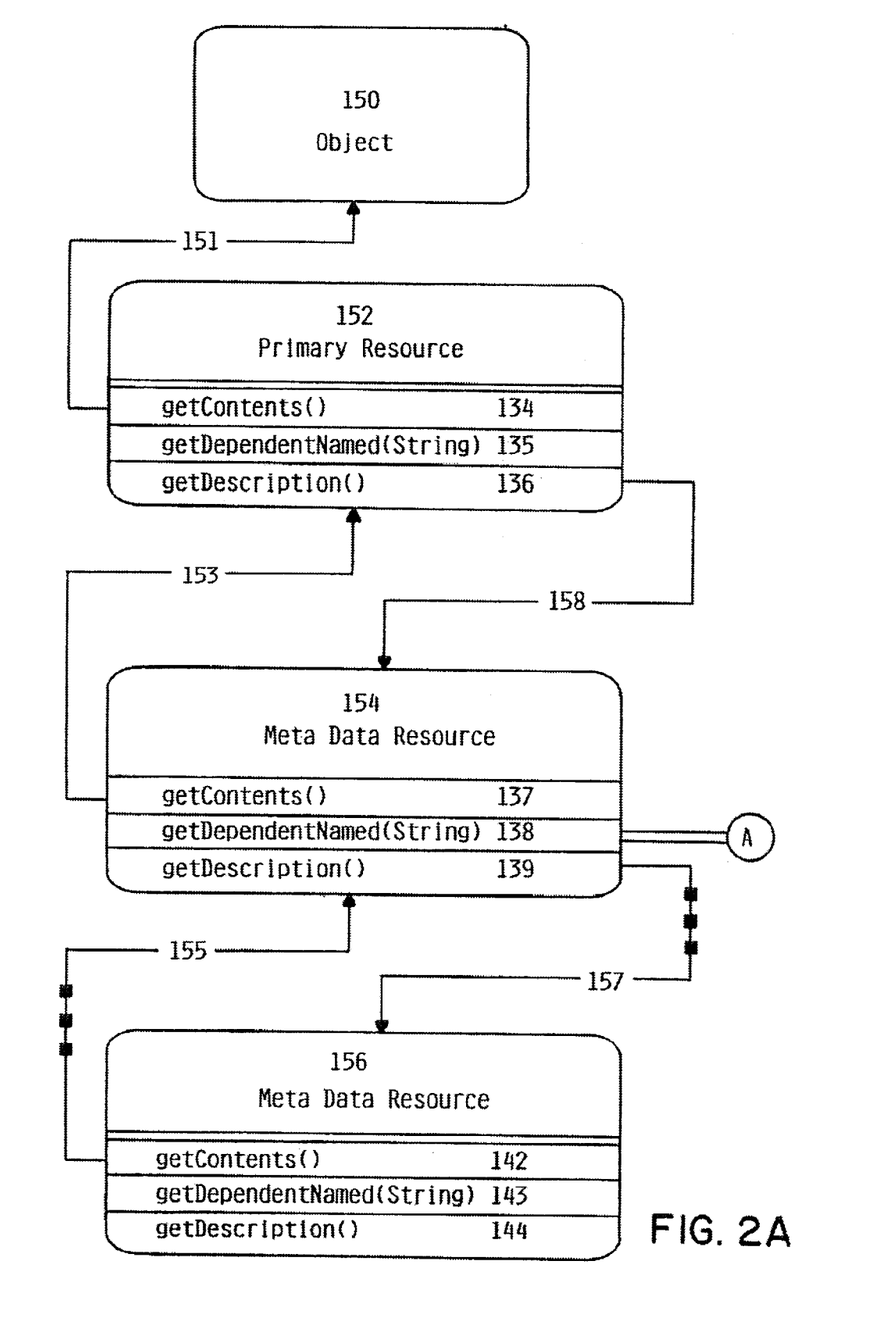
FIGS. 2A and 2B (herein collectively referred to as FIG. 2) are a diagrammatic representation of the Resource object of FIG. 1.
Figure 2B:
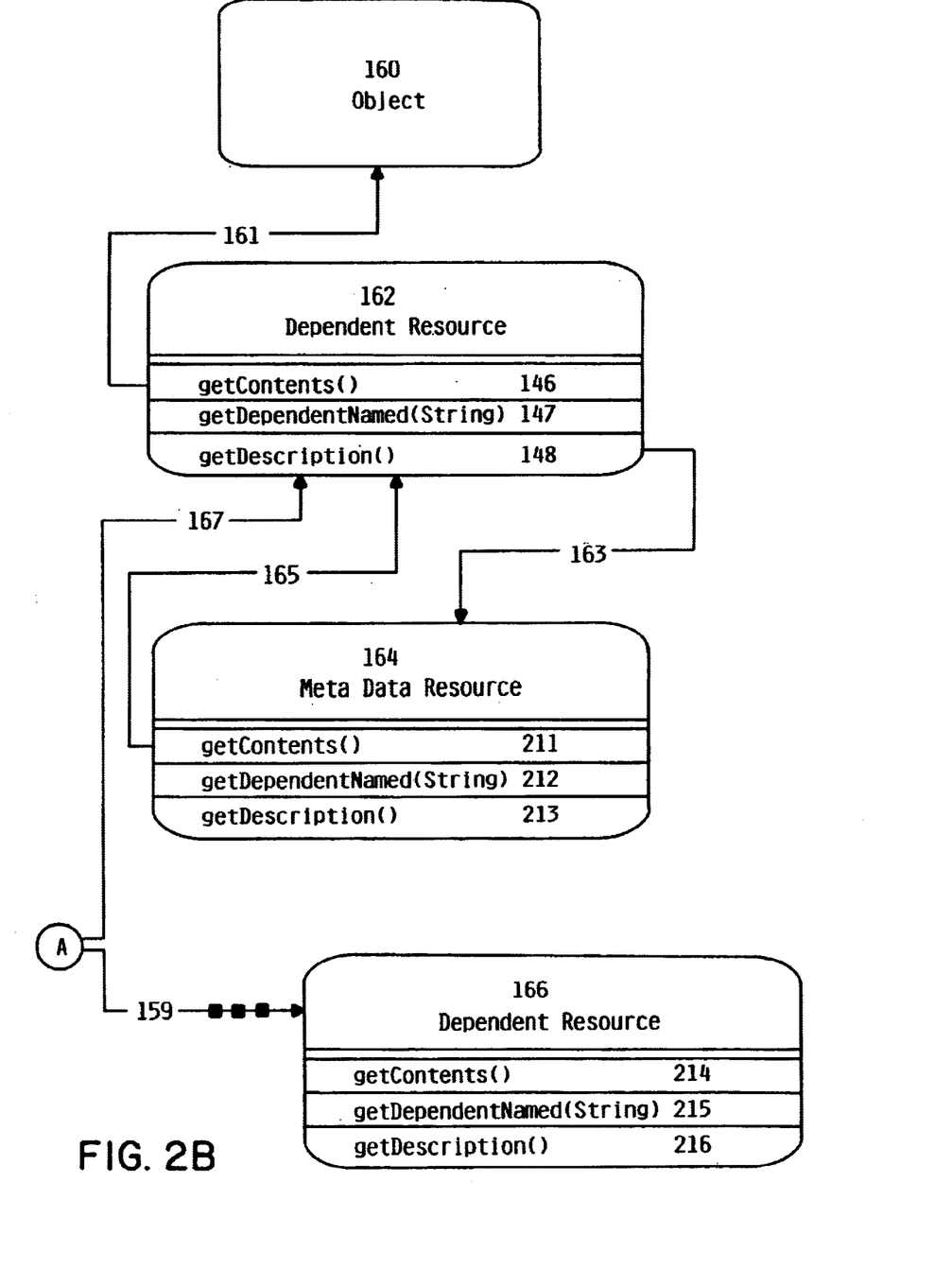

In an object diagram such as FIG. 2, (1) an arrow 151 indicates that the object 150 pointed to is referenced by a defining object's 152 method 134; and (2) arrows 159 with dots (ellipses) represent a relationship with an object 166 of that type that is recursive in the sense that additional objects of that type can exist.

Figure 5A:
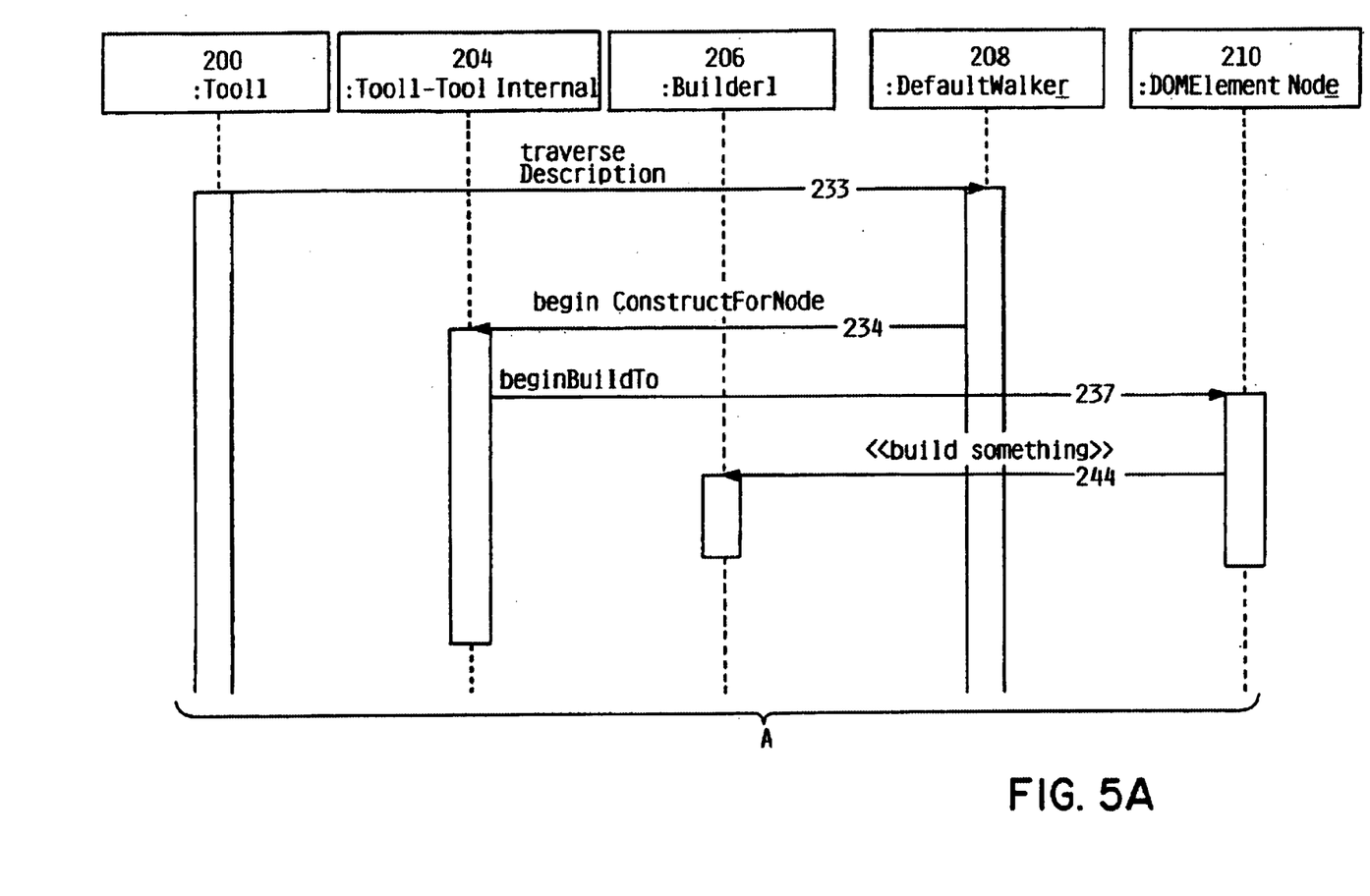
FIGS. 5A, 5B and 5C (herein collectively referred to as FIG. 5) are an object interaction diagram further describing Tool components of FIGS. 1 and 4.
Figure 5B:
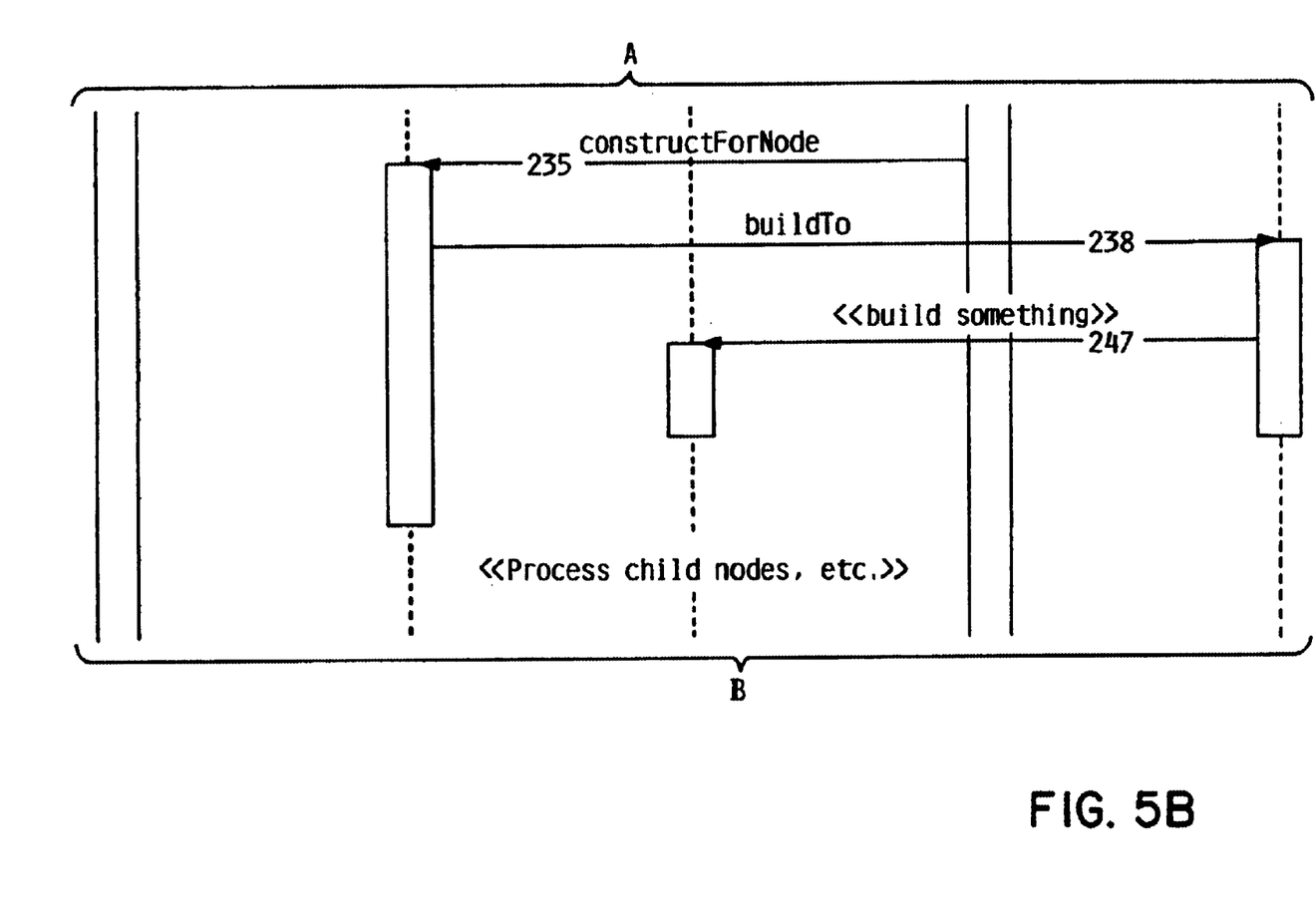
Figure 5C:
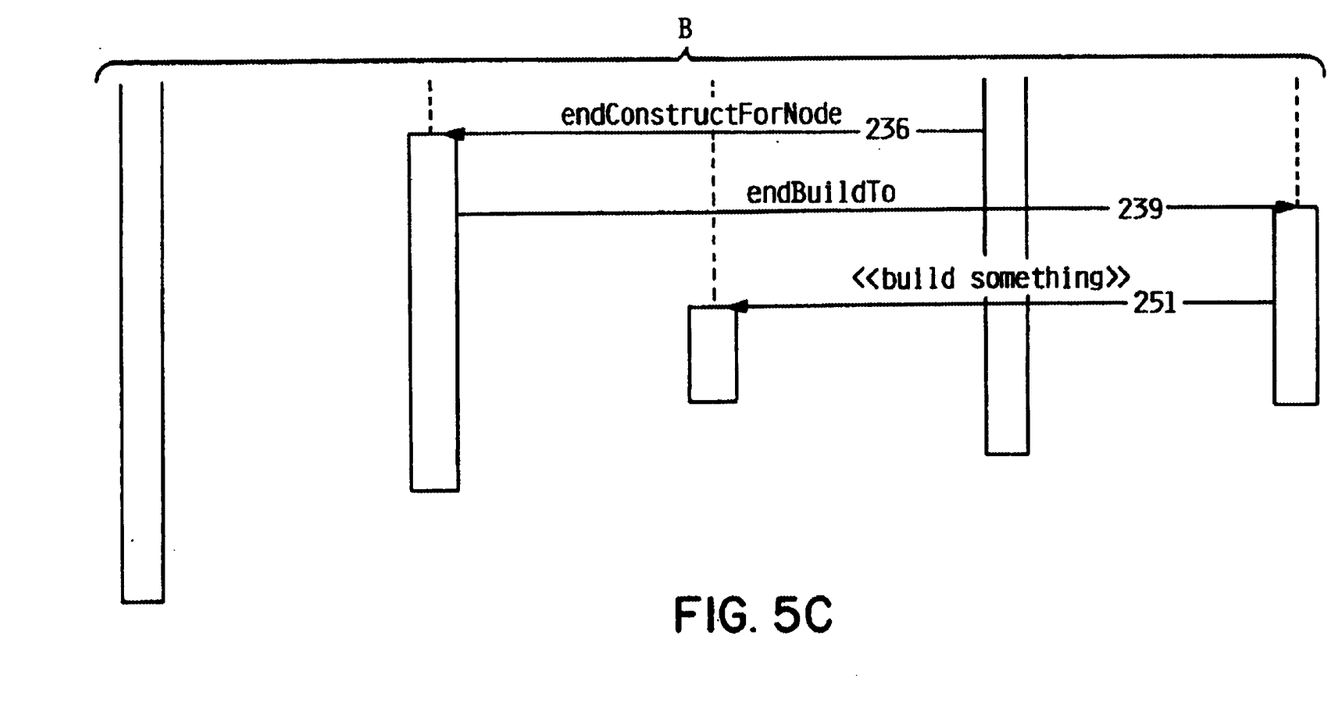

In an object interaction diagram such as FIG. 5, (1) the objects are listed across the top; (2) the order of method invocations goes from top to bottom (top to bottom is time); and (3) the arrows represent method invocations. For example, arrow 233 represents the first method to be invoked; that is, Tool1 object 200 invokes the traverseDescription method 233 on DefaultWalker object 208, and arrow 234 represents that DefaultWalker object 208 then invokes the beginConstructForNode method on Tool1-ToolInternal object 204.

Figure 3:
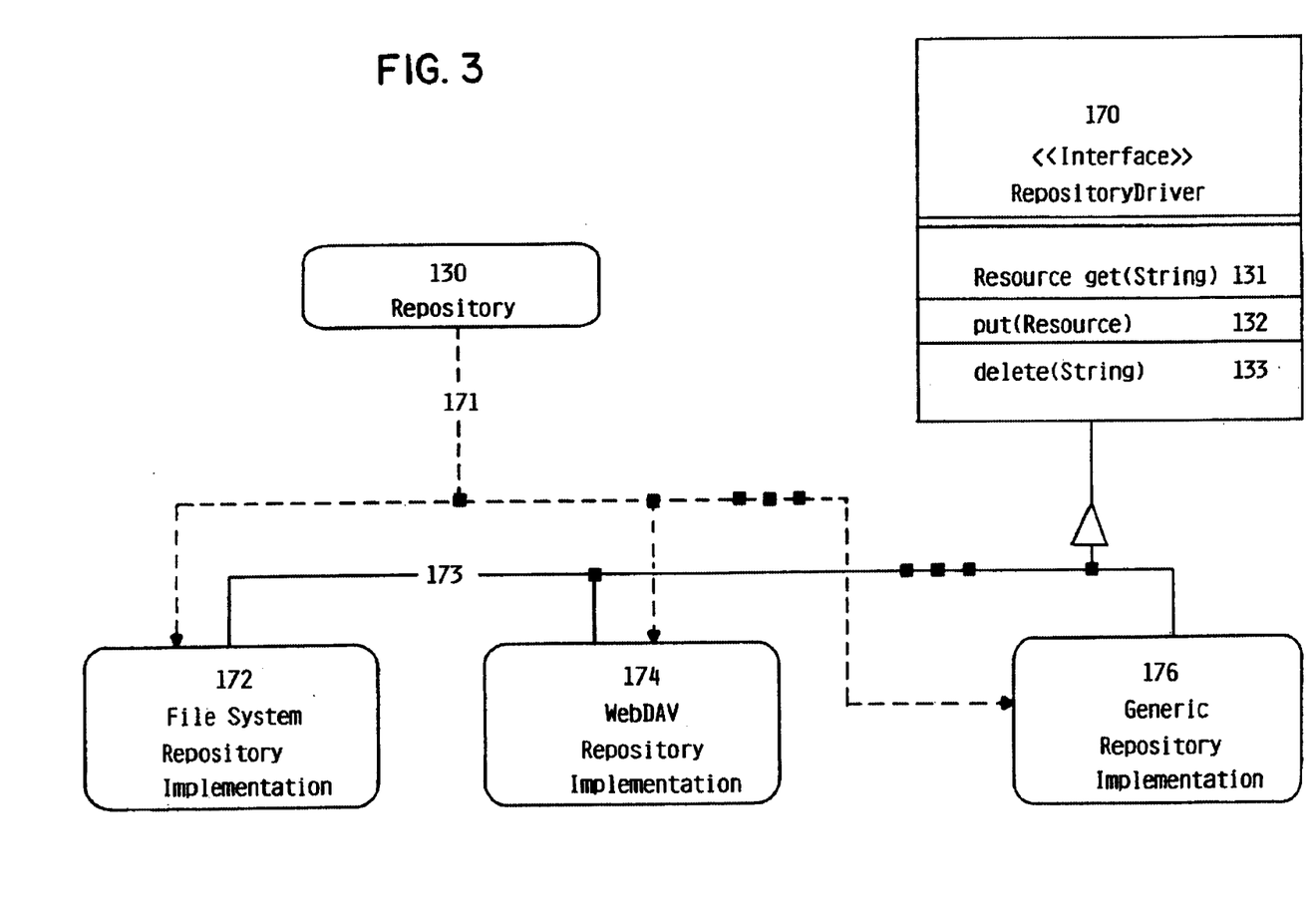
FIG. 3 is a diagrammatic representation of the Repository object of FIG. 1.

In FIGS. 2 and 3, round corners on an object represent an object, while square corners represent a class.

Description of the ToolFrame

An exemplary embodiment of the invention, also referred to as ToolFrame, may be implemented for generating code from XML meta data, or equivalent, in various programming languages, such as C++ or the Java™ language as defined by Sun Microsystems, Inc., as will be more fully described hereafter.

The HyperText Markup Language (HTML) is a simple markup language used to create hypertext documents that are portable from one platform to another. HTML documents are SGML documents with generic semantics that are appropriate for representing information from a wide range of applications. XML is a simple dialect of SGML which enables generic SGML to be served, received, and processed on the Web in the way that is now possible with HTML. XML has been designed for ease of implementation and for interoperability with both SGML and HTML. It is more fully described on the Internet at www.w3.org/XML.

Figure 1A:
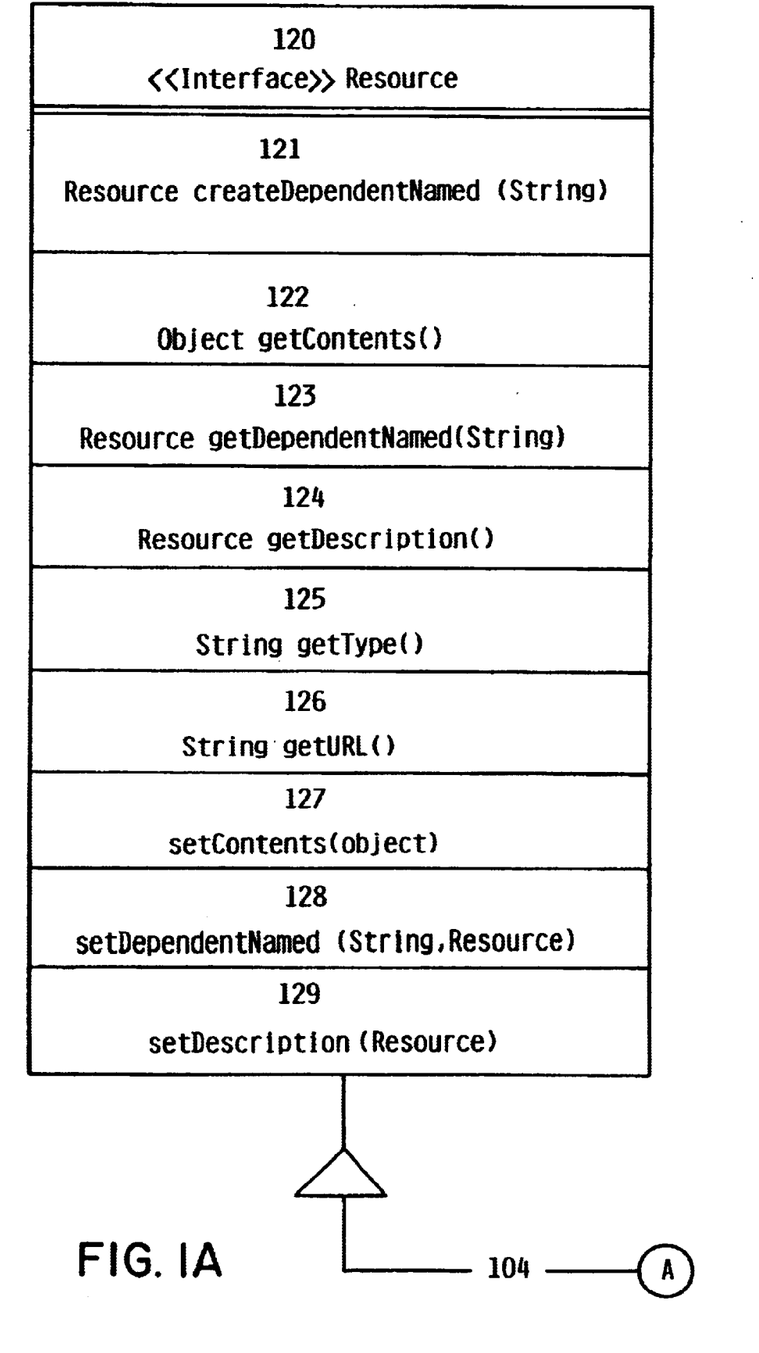
FIGS. 1A and 1B (herein collectively referred to as FIG. 1) are a class diagram of the ToolFrame abstraction of the preferred embodiment.
Figure 1B:
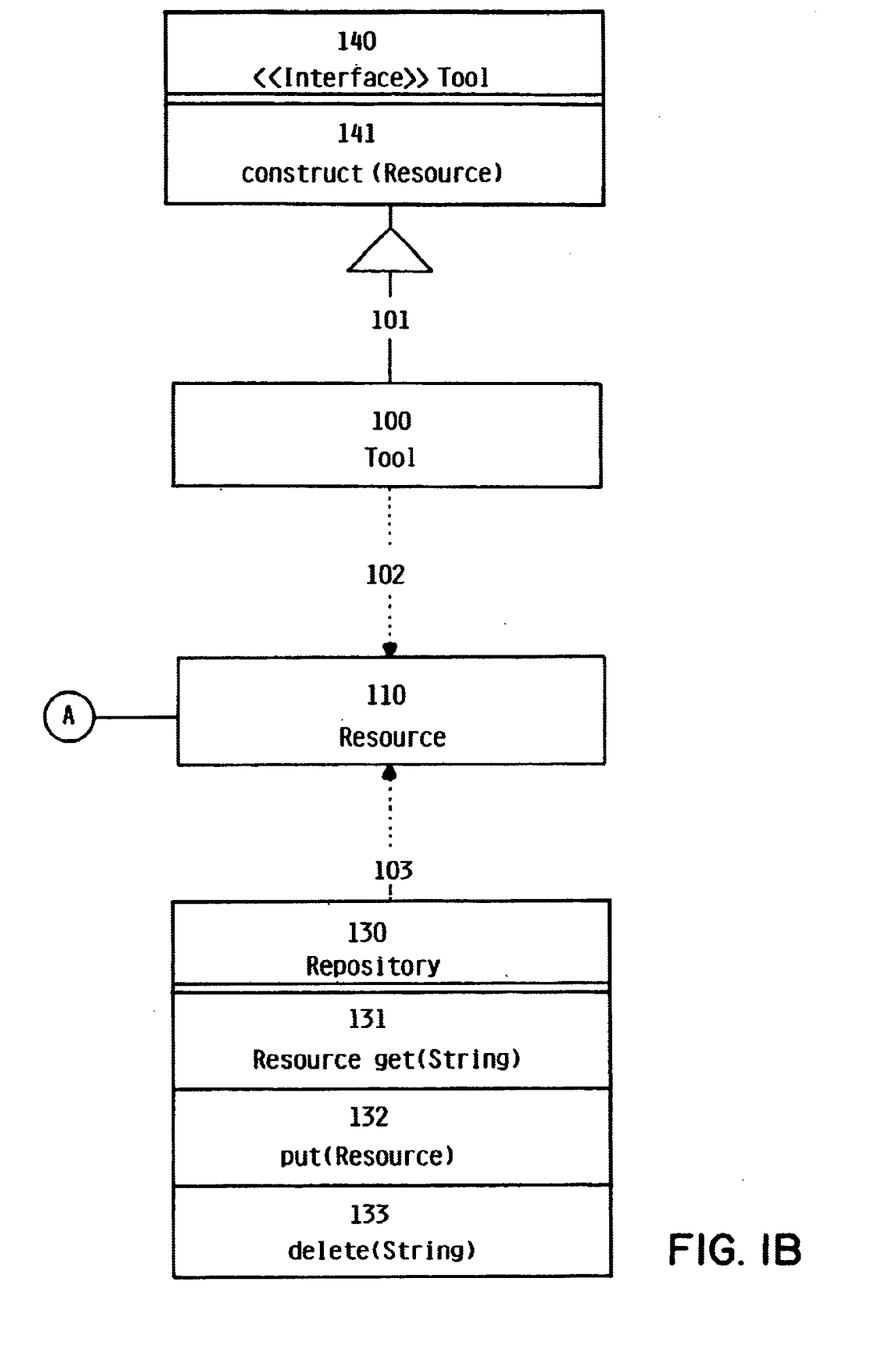

Referring to the class diagram of FIG. 1, ToolFrame is a code generation tooling framework that may be abstracted into the three major components Resource 110, Repository 130, and Tool 100. As is represented by open arrow 104, Resource 110 implements Resource interface 120. As is represented by open arrow 101, tool 100 implements Tool interface 140. As is represented by closed dotted arrow 102, Tool 100 has an implicit reference to Resource 110. As is represented by closed dotted arrow 103, Repository 130 has an implicit reference to Resource 110.

Resource Component 110

Resource component 110 is the common object that is used by and passed between tools 100. Resource 110 is an encapsulation of data that a tool 100 needs and/or produces and it is also an encapsulation of data (meta-data) that describes other data.

Referring to FIG. 2, Resource 110 is recursive in nature, as is illustrated by Resource 110 instantiations 152, 154, and 156. That is, a Resource 152 may have another Resource 154 stored as a description to describe the contents stored in Resource 152. Resource 154 may, in turn, have a description as a Resource 156 to describe its contents. By being recursive in nature, data needed by Tool 100 can be conveyed through one Resource 110 instance; that instance will typically comprise many resource 110 instances 152, 154, 156, etc. Objects 154, 162, and 166 are directly or indirectly dependents of parent object 152, meaning that they contain further information used or required by parent 152.

Referring again to FIG. 1, Resource 110 implements Resource interface 120, which contains the following defined methods which are represented in Java syntax: Resource createDependentNamed(String) 121; Object getcontents( ) 122; Resource getDependentNamed(String) 123; Resource getDescription( ) 124; String getType( ) 125; String getURL( ) 126; setContents(Object) 127; setDependentNamed(String,Resource) 128; and setDescription(Resource) 129.

Resource createDependentNamed(String) 121 creates a Resource that can be used as a dependent. The argument that is passed is the name of the Resource. Dependents are tool data that are needed or defined in association with the defining Resource. An example of this may be associated code.

Object getContents( ) 122 returns the contents of the Resource.

Resource getDependentNamed(String) 123 returns the Resource that is a dependent using the name as the key.

Resource getDescription( ) 124 returns the description of the Resource. The description is itself a Resource.

String getType( ) 125 returns the type of the Resource. That is, is it Java, XML, etc.

String getURL( ) 126 returns the uniform resource locator (URL) of the Resource as a string representation.

setContents(Object) 127 sets the contents of the Resource to the argument that is specified.

setDependentNamed(String, Resource) 128 sets the argument Resource to be a dependent with the name that is passed as the first argument.

setDescription(Resource) 129 sets the description to be the argument Resource.

Tool 100 implements Tool interface 140, which includes the method construct(Resource) 141. construct(Resource) 141 is the method that initiates the Tool. It is the common application programming interface (API) among all the Tools. It takes in the argument Resource.

Repository 130 includes methods Resource get(String) 131, put(Resource) 132, and delete(String) 133.

Resource get(String) 131 retrieves the Resource that is defined by the URL string representation argument from the Repository. If no Resource exists, one is created by default having the same URL as that specified.

put(Resource) 132 stores the Resource into the Repository that is defined by the URL of the Resource.

delete(String) 133 removes the Resource defined at the specified URL.

A Resource 110 is located at a URL identifier obtained by string getURL( ) 126. Hence the Resource 110 for Tool 100 may be stored in a local file system, in a location on the World Wide Web or even within a tooling environment (a specific development environment). Resource 110 implements the Resource interface 120 that is specific to it. One example of Resource 110 can be generated code that a Tool 100 produces. The Resource 110 implements Resource getDescription( ) 124, which is a method executed to obtain a Resource used to describe the data. An example of this is meta data, such as XML, that is needed by Tool 100 in the process of generating code. Resource 110 may also have dependents accessed by method 123 that are themselves Resources, as will be discussed hereafter.

Referring to FIG. 2, an example of a Resource object diagram is illustrated. A Resource component 110 can contain tool data which are also implemented as Resources. While, for the purpose of defining the relationships between the objects in FIG. 2, only the three most relevant interface methods for this illustration, that is getContents( ), getDependentNamed(String), and getDescription( ), are shown, the interface actually includes all of the Resource interface methods 121–129, some or all of which may be implemented.

Thus, in FIG. 2, primary resource 152 implements Resource interface methods including getContents( ) 134, getDependentNamed(String) 135, and getDescription( ) 136. As is represented by closed arrows 151 and 158, methods 134–136 reference object 150 and meta data resource 154, respectively. Similarly, as is represented by closed arrows 153, 157, 159, and 167, interface methods 137–139 implemented by meta data resource 154 reference primary resource 152, meta data resource 156, dependent resource 166, and dependent resource 162, respectively; as is represented by closed arrow 155, meta data resource 156 interface methods 142–144 reference meta data resource 154; as is represented by closed arrows 161 and 163, dependent resource 162 interface methods 146–148 reference object 160 and meta data resource 164, respectively;

and as is represented by closed arrow 165, meta data resource 164 interface methods 211–213 reference dependent resource 162.

Repository Component 130

Referring to FIG. 3, as is represented by open arrow 173, File System Repository Implementation 172, WebDAV Repository Implementation 174, and Generic Repository Implementation 176 each implement RepositoryDriver interface 170. There are no limitations on the types of Repository implementations; Repository implementations 172, 174, 176 are simply examples. As is represented by closed arrow 171, Repository 130 references Repository implementations 172, 174, and 176.

RepositoryDriver interface 170 is an interface which other objects 172, 174, 176 can implement, and those implementing objects are used by Repository 130. As an example, object 172 is an implementation of RepositoryDriver interface 170 that Repository 130 references as an instance.

Referring further to FIG. 1 in connection with FIG. 3, Repository component 130 is an object that allows Tool 100 to interact with the current environment (here "environment" refers to File System Repository Implementation 172 and WebDAV Repository Implementation 174) for storing, retrieving, and deleting of Resources. In particular, Repository component 130 includes methods Resource get(String) 131, put(Resource) 132 and delete(String) 133, which are methods used for storing, retrieving, and/or deleting, respectively, Resource 110. This Repository component 130 is just a "wrapper" for different types of environments with which Resource 110 may interact. (By "wrapper" is meant that it is the only object that objects outside of the wrapper access. Thus, in FIGS. 1 and 3, Tool 100 and Resource 110 access Repository 130, and are not aware of or concerned with the existence of the different Repository implementations 172, 174, 176.) For example, a File System Repository Implementation 172 may exist for a local file system and another WebDAV Repository Implementation 174 for a WebDAV environment. A WebDAV environment is a distributed and collaborative authoring and versioning environment that can have storage that exists on the Internet (see www.webdav.org for details on the WebDAV specification). In both cases, the actual implementation is hidden from Tool 100. This allows Tool 100 to be independent of the environment 172, 174, etc. which needs to access Resource 110; Tool 100 does not know which Repository implementations 172, 174, etc. exist, but only that Repository component 130 exists, making the Tool 100 independent of the environment to which it is to store Resource 110. Repository component 130 of FIGS. 1 and 3 is a separate class with methods 131, 132, 133 substantially the same as those defined in the RepositoryDriver interface 170 of FIG. 3.

Tool Component 100

Figure 4A:
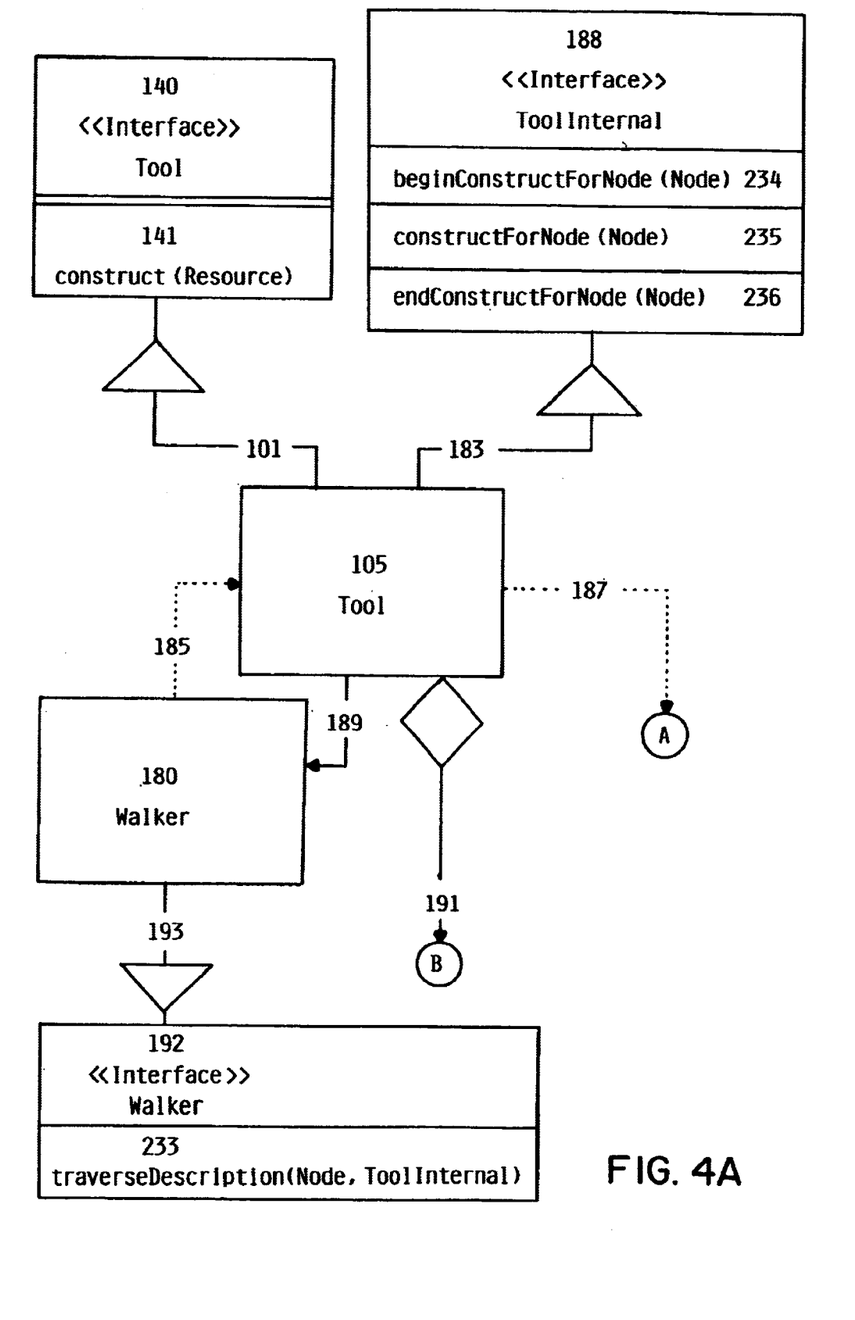
FIGS. 4A and 4B (herein collectively referred to as FIG. 4) are a class diagram of the Tool component of FIG. 1.
Figure 4B:
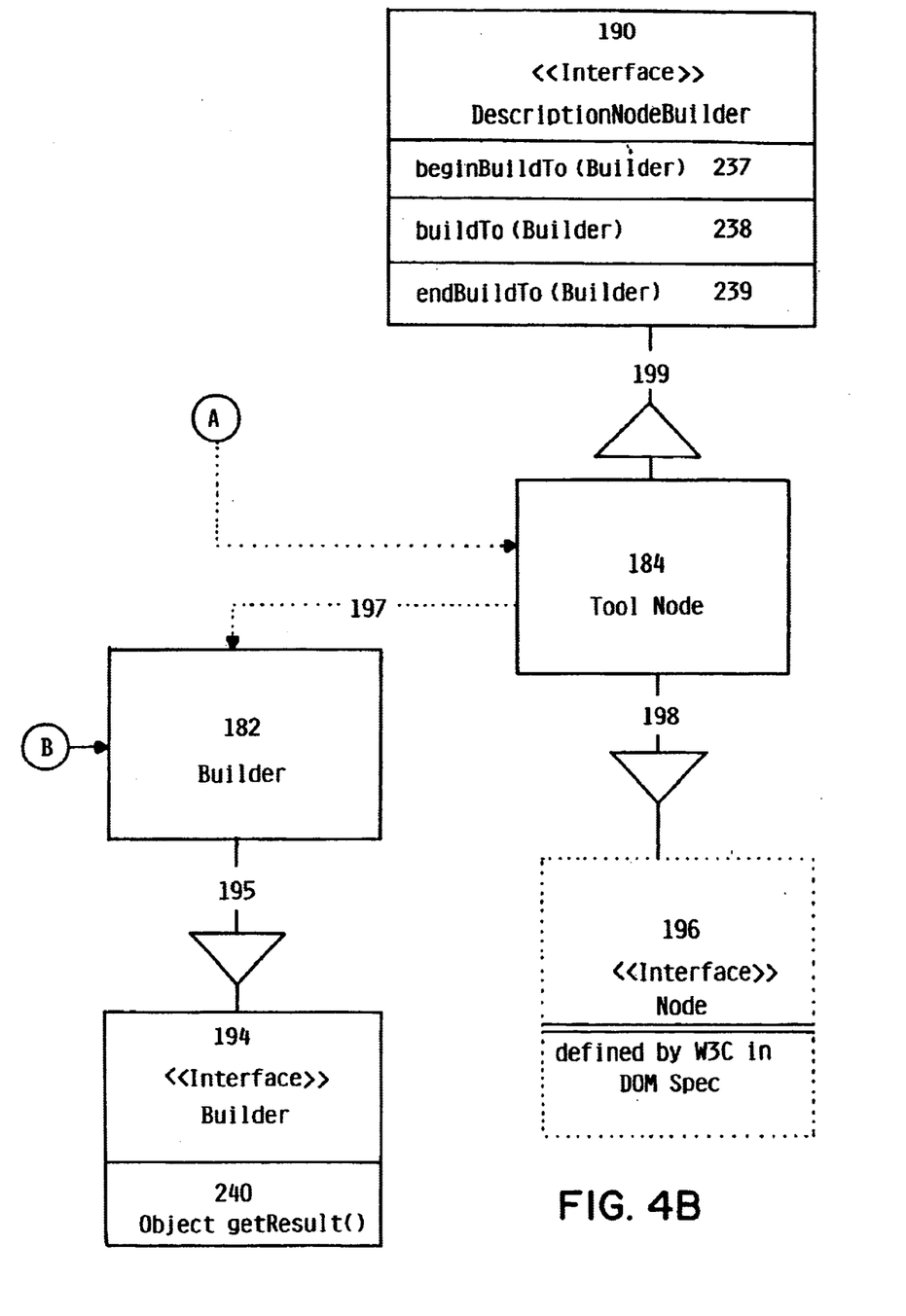

Referring to FIG. 4, a preferred, though exemplary, embodiment of the tool component 100 of FIG. 1 comprises an object for generating code from XML meta data. Tool 100 may be designed for different implementations depending on the purpose of the tool.

On a detailed level, Tool component 100 of the ToolFrame to generate code from XML may be constructed by Tool 105, which implements Tool interface 140 and ToolInternal interface 188, Walker 180 which implements Walker interface 192, ToolNode 184 which implements both DescriptionNodeBuilder interface 190 and Node interface 196, and Builder 182 which implements Builder interface 194. Tool 105 can be viewed as Tool 100 in FIG. 1. However, Tool 100 is more generic; it could be a tool for any purpose. For the purpose of FIG. 4, Tool 100 is for code generation, and is represented by Tool 105.

As is represented by open arrows 101 and 183, respectively, Tool 105 implements Tool interface 140, including method construct(Resource) 141 (as described herein before), and ToolInternal interface 188, including interface methods beginConstructForNode(Node) 234, constructForNode(Node) 235, and endConstructForNode(Node) 236. As is represented by closed arrows 189 and 187, respectively, Tool 105 references Walker 180 and Tool Node 184. As is represented by closed diamond arrow 191, Tool 105 owns Builder 182.

beginConstructForNode(Node) 234 is the method invoked on Tool 105 to perform any preprocessing of Tool Node 184 that is passed as an argument.

constructForNode(Node) 235 is the method invoked on Tool 105 to perform processing of the Tool Node 184 that is passed as an argument.

endConstructForNode(Node) 236 is the method invoked on Tool 105 to perform any postprocessing of the Tool Node 184 that is passed as an argument.

As is represented by open arrows 199 and 198, respectively, Tool Node 184 implements DescriptionNodeBuilder interface 190, including interface methods beginBuildTo(Builder) 237, buildTo(Builder) 238, and endBuildTo(Builder) 239; and implements Node interface 196, which is defined by the W3 Consortium (W3C) in the Document Object Model Level 1 (DOM) specification found on the Web at www.w3.org/DOM/. DOM is a platform- and language-neutral interface that allows programs and scripts to dynamically access and update the content, structure, and style of documents. The Document Object Model provides a standard set of objects for representing HTML and XML documents, a standard model of how these objects can be combined, and a standard interface for accessing and manipulating them. Vendors can support the DOM as an interface to their proprietary data structures and APIs, and content authors can write to the standard DOM interfaces rather than product-specific APIs, thus increasing interoperability, for example, on the Web.

beginBuildTo(Builder) 237 is the method invoked when any preprocessing is needed on the Builder object 182 that is passed as an argument.

buildTo(Builder) 238 is the method invoked when processing is needed on the Builder object 182 that is passed as an argument.

endBuildTo(Builder) 239 is the method invoked when any postprocessing is needed on the Builder object 182 that is passed as an argument.

In a preferred embodiment of the invention, Node interface 196 conforms to the DOM specification for a Node interface (www.w3.org/DOM/). According to that specification, the Node interface is the primary datatype for the entire Document Object Model. It represents a single node in a document tree. While all objects implementing the Node interface expose methods for dealing with children, not all objects implementing the Node interface may have children. The attributes nodeName, nodeValue are included as a mechanism to get at node 196 information. Specialized interfaces may contain additional and more convenient mechanisms to get and set the relevant information.

In accordance with the DOM specification for a node interface, such as Node interface 196, Node interface 196 may have a nodeType of ELEMENT_NODE, ATTRIBUTE_NODE, TEXT_NODE, CDATA_SECTION_NODE, ENTITY_REFERENCE_NODE, ENTITY_NODE, PROCESSING_INSTRUCTION_NODE, COMMENT_NODE, DOCUMENT_NODE, DOCUMENT_TYPE_NODE, DOCUMENT_

FRAGMENT_NODE, or NOTATION_NODE. Its attributes may include nodeName, which is the name of this node, depending on its type; nodeValue, which is the value of this node; nodeType, a code representing the type of the underlying object; parentNode, representing the parent of this node (where all nodes, except Document, DocumentFragment, and Attr have a parent, but will have a value of null if this node has just been created and not yet added to the tree or if it has been removed from the tree); childNodes, a NodeList that contains all children of this node; firstChild, representing the first child of this node; lastChild, representing the last child of this node; previousSibling, representing the node immediately preceding this node; nextSibling, representing the node immediately following this node; attributes, a NamedNodeMap containing the attributes of this node (if it is an Element); and ownerDocument, representing the Document object associated with this node, which is the Document object used to create new nodes.

Node interface 196 can include methods insertBefore, for inserting the node newChild before the existing child node refChild; replaceChild for replacing the child node oldChild with newChild in the list of children; removeChild for removing the child node indicated by oldChild from the list of children, and returns it; appendChild for adding the node newChild to the end of the list of children of this node; hasChildNodes, a convenient method for allowing easy determination of whether a node has any children; and cloneNode for returning a duplicate of this node, i.e., serves as a generic copy constructor for nodes.

As is represented by closed arrow 185, Walker 180 references Tool 105. As is represented by open arrow 193, Walker 180 implements Walker interface 192, which includes interface method traverseDescription(Node, ToolInternal) 233.

traverseDescription(Node, ToolInternal) 233 is the method which defines how the Tool Node 184 is to be traversed, and against which ToolInternal 188 reference to invoke the processing steps.

As is represented by open arrow 195, Builder 182 implements Builder interface 194, including interface method object getResult( ) 240.

Object getResult( ) 240 returns the results of the Builder 182.

Tool 105

Tool 105, one example of Tool 100, is the component that interacts with other Tools 100. The parameter that is passed to this component 105 is a Resource 110. Because only Resources 110 are passed between Tools 100, composing tools with one another (that is, having two Tools 105 talking to one another) is greatly facilitated. Tool 105 may receive Resources from other tools (not shown in FIG. 4).

ToolInternal 188

The ToolInternal interface 188, as implemented by Tool 105, handles the nodes that have been traversed by Walker 180, as is represented by solid arrows 185 and 187. In general, a node is an object defined by the DOM specification (as discussed herein before). In addition, the node can have an additional defined interface which is DescriptionNodeBuilder interface 190, making the node a ToolNode 184. However, this additional defined interface is not necessary.

The implemented ToolInternal interface 188 processes nodes (as is represented by closed arrow 187) in a variety of ways. One method is to process it itself by looking up the node within a dictionary structure and performing the function stored there. This will require that ToolInternal 188 knows what type of nodes will be defined. Another method is to invoke methods on the DescriptionNodeBuilder interface 190 implementation which will allow the ToolInternal 188 to be independent of the ToolNodes 184 (see the DescriptionNodeBuilder interface as described herein before) defined within the meta data of Tool 105; this is further described hereafter in connection with the DescriptionNodeBuilder interface 190. Nodes which may be traversed are those that implement the Node interface 196 as defined by the DOM specification.

In addition, ToolInternal interface 188 allows a defining Tool 105 to perform special processing of the DOM structure defined in the Resource 110 passed to the Tool 105 as an argument. For example, the delegation of responsibility of nodes to different Tools 105 may be performed. The DOM structure is a hierarchy of nodes, one of which (Tool Node 184) is illustrated.

Walker 180

The Walker component 180 traverses the DOM representation passed to it by the Tool 105 (also referred to as the DOM structure, one node of which is Tool Node 184). As is represented by closed arrows 185 and 187, for each Tool Node 184 within the DOM representation of the XML, Walker 180 will, by executing method beginConstructForNode(Node) 234, signal ToolInternal 188 that Tool Node 184 has been reached; by executing method constructForNode(Node) 235 process the Tool Node; and by executing method endConstructForNode(Node) 236 signal that the Tool Node has been passed.

Many concrete implementations of Walker interface 192 can be implemented that traverse each DOM representation differently. For example, an implementation of Walker interface 192 can traverse the DOM structure in inorder, preorder, or postorder manners. An implementation of Walker interface 192 may also traverse only particular sections of the DOM structure.

DescriptionNodeBuilder 190

The DescriptionNodeBuilder interface 190 is associated to each interested node defined by the DOM; nodes that are defined within the DOM will have an implementation of this interface 190 and will be referred to as a Tool Node 184. By having Tool Nodes 184 defined with such an implementation, Builder 182 as well as ToolInternal 188 are independent of the Tool Nodes 184 in the DOM structure. This is greatly beneficial because should the XML representation change by the addition or subtraction of nodes, the Tool 105 itself should not need to change as long as the required nodes represented by Tool Nodes 184 are present.

Builder 182

Builder component 182 is responsible for generating the code. Because it is an independent component, Builders 182 for different languages may be substituted easily. For example, one can have code generation in Java as well as C++ by having a different Builder 182 which is implemented differently for generating each language; the underlying components, including Tool 105, Walker 180, and the Tool Nodes 184 need not change. Also there may be chaining of various Builders 182 together to produce an overall result. For example, there may be a Builder 182 that generates arrays and another Builder 182 that generates inner classes and by combining the results of the Builders, an overall class is produced.

Object Interaction

FIG. 5 depicts the interaction between the various components within the Tool component 100, where Tool1 200 is an instance of Tool 105; Tool1-ToolInternal 204 is an instance of a class that implements ToolInternal interface

188, this could be the same instance as that of Tool 105; Builder1 206 is an instance of Builder 182; DefaultWalker 208 is an instance of Walker 180; and DOMElementNode 210 is an instance of Tool Node 184.

Referring to FIG. 5 in connection with FIG. 4, Tool1 200 invokes the method traverseDescription 233 against the object DefaultWalker 208. The DefaultWalker 208 uses the DOMElementNode 210 and Tool1-ToolInternal 204 arguments passed in by traverseDescription 233 to call a series of methods. The first set is to allow any preprocessing on the DOMElementNode 210. It begins by the invocation of the beginConstructForNode method 234 which is against the Tool1-ToolInternal 204. The Tool1-ToolInternal 204 consequently invokes the beginBuildTo method 237 against the DOMElementNode 210. The DOMElementNode 210 then does any preprocessing on the Builder1 206 with method 244. Once the first set is completed, the second set of method calls is invoked to do processing of the DOMElementNode 210. This starts with the constructForNode method 235 call which is against Tool1-ToolInternal 204. The Tool1-ToolInternal 204 then invokes the buildTo method 238 against the DOMElementNode 210. The DOMElementNode 210 then invokes method 247 on the Builder1 206. After the second set of method calls, depending if the DOMElementNode 210 itself has children DOMElementNodes, the DefaultWalker 208 may start the process again starting with the method invocation beginConstructForNode 234. However, if there are no children DOMElementNodes 210, then the third set of method calls is initiated to do any postprocessing of the DOMElementNode 210. The method endConstructForNode 236 is invoked against the Tool1-ToolInternal 204. The Tool1-ToolInternal 204 then invokes the endBuildTo method 239 against the DOMElementNode 210. The DOMElementNode 210 in turn invokes method 251 on the Builder1 206 to do any postprocessing of itself.

Advantages of the Present Invention

It is an advantage of the invention that there is provided a system and method for tool development having a structured, consistent way of developing tools that can ease implementation.

It is an advantage of the invention that there is provided a common interface whereby various tools can communicate with one another.

It is an advantage of the invention that there is provided a tool component which is independent of its environment and tool data. This allows the deployment in multiple environments to be transparent to the tool.

It is an advantage of the invention that there is provided a tool development system and process that facilitates ease of substitution between various tools and components interacting to the tool such as user interface (UI) components, different tools, etc.

It is an advantage of the invention that there is provided a tool development system and process that allows different structures to be generated as well as to have those structures generated in different programming languages. Code generation in different programming languages is relatively easy. Should the tool need to generate code to another programming language, it is only required to implement the Builder, there being no need to reimplement the other components. This facilitates substitution of different code generation builders. Similarly, by using different Builders, generation of different code structures or code generated tasks is facilitated.

In accordance with the preferred embodiment of the invention, tool composition and communication is facilitated through use of a common component that is passed around as a Resource that encapsulates the tool data. A tool can be responsible for doing one action and pass off responsibility to another tool with ease.

The tool is separated functionally from other components. This allows different components, such as a GUI component rendering the tool and other tool components to be substituted with ease. Also different implementations of Resources, Repositories, and Tools may be used as long as they adhere to the defined interfaces laid out for their components.

Furthermore because all of the components are separate and independent from one another, little or no reimplementation is required when components change.

Tool data in the form of Resources can be stored anywhere on the Web and be accessible by the Tool.

Resources are structured in such a way that meta data that describes data or other meta data is possible. Also, associated Resources related to the defining Resource are accessible. This allows several benefits such as having a compact object contain all tool data information as well as the ability of reconstructing the data by invoking the tool again using just the Resource.

Modifying the tool data stored in the Resource has little or no impact on the tool itself. Only specific components will be affected, thus making change fast and easy.

While this invention has been described in relation to preferred embodiments, it will be understood by those skilled in the art that changes in the details of processes and structures may be made without departing from the spirit and scope of this invention. Many modifications and variations are possible in light of the above teaching. Thus, it should be understood that the above-described embodiments have been provided by way of example rather than as a limitation and that the specification and drawings are, accordingly, to be regarded in an illustrative rather than a restrictive sense.

What is claimed is:

1. A code generation tooling framework, comprising:
   a resource component, said resource component representing information shared between components;
   a tool component having a reference to said resource component, said tool component comprising at least one object for generating code from data in said resource component; and
   a repository component separate from said resource component and from said tool component, said repository component having a reference to said resource component, said repository component comprising a wrapper class and a plurality of repository implementations, each repository implementation corresponding to a respective environment, said wrapper class enabling said tool component to interact with a current environment selectively for storing, retrieving, and deleting said resource component;
   wherein said tool component is independent of the environment in which said resource component is stored.

2. The code generation tooling framework of claim 1, said resource component selectively including an encapsulation of data and of meta-data that is needed or consumed by said tool component, said resource component being retrieved or stored by said repository component.

3. The code generation tooling framework of claim 2, said resource component comprising a plurality of recursively generated resource components with data required by said tool instance being conveyed through one instantiation of said resource component.

4. The code generation tooling framework of claim 2, said resource component implementing a resource interface, said resource interface comprising methods for:
returning contents of said resource component;
returning a resource that is a dependent; and
returning the description of said resource component.

5. The code generation tooling framework of claim 4, said resource interface further comprising methods for:
creating a resource component that can be used as a dependent;
returning the type of said resource component;
returning the location of said resource component;
setting the contents of said resource component to a specified argument;
setting said resource component to be a dependent; and
setting said description to a specified resource argument.

6. The code generation tooling framework of claim 1, said tool component comprising an object for generating code from markup language meta data.

7. The code generation tooling framework of claim 1, said tool component further comprising:
a walker component for traversing a hierarchal structure of nodes;
a tool internal component for processing nodes traversed by said walker component; and
a builder component for generating said code.

8. The code generation tooling framework of claim 7, said tool internal component being selectively operable for processing said nodes by performing the function accessed in a dictionary structure or by invoking methods implemented by said tool node.

9. The code generation tooling framework of claim 7, further comprising a plurality of chained builder components for generating an overall class from a plurality of objects selectively including arrays and inner classes.

10. The code generation tooling framework of claim 7, said tool component further comprising a description node builder component associated with each node in said hierarchal structure for rendering said tool internal component and said builder component independent of said nodes.

11. A method for generating code, comprising the steps of:
executing a traverse description method including a node argument and a tool internal argument against a walker object;
operating said walker object responsive to said traverse description method to selectively call first methods, second methods and third methods;
said first methods including:
invoking a tool internal method for preprocessing on a first node;
operating said tool internal object to invoke a begin to build method against said first node to execute any required preprocessing by said first node on said builder object;
said second methods including:
invoking said tool internal method to perform processing of said first node;
operating said tool internal object to invoke a build to method to execute processing by said first node on said builder object;
said third methods including:
invoking said tool internal method to perform post processing of said first node;
operating said tool internal object to invoke an end build to method to execute any post processing by said first node needed on said builder object.

12. The method of claim 11 for execution against a hierarchy of nodes including said first node and at least one child node including the step of executing said first, second and third methods in turn with respect to each said child node.

13. The method of claim 12, wherein each said node is a DOM element node.

14. A system for generating code, comprising:
a first tool for executing a traverse description method including a node argument and a tool internal argument against a walker object;
said walker object being responsive to said traverse description method to selectively call first methods, second methods and third methods;
said first methods including:
a preprocessing call to a tool internal method for preprocessing on a first node;
said tool internal object being responsive to said preprocessing call for invoking a begin to build method against said first node to execute any required preprocessing by said first node on said builder object;
said second methods including:
a processing call to said tool internal for processing of said first node;
said tool internal object being responsive to said processing call to invoke a build to method to execute processing by said first node on said builder object;
said third methods including:
a post processing call to said tool internal for performing post processing of said first node;
said tool internal object being responsive to said post processing call to invoke an end build to method to execute any post processing by said first node needed on said builder object.

15. A method for building a code generation tooling framework, comprising the steps of:
instantiating a resource component, said resource component representing information shared between components;
instantiating a tool component, said tool component having a reference to said resource component, said tool component comprising code generating objects for generating code from markup language meta data; and
instantiating a repository component separate from said resource component and from said tool component, said repository component having a reference to said resource component and comprising a wrapper class and a plurality of repository implementations, each repository implementation corresponding to a respective environment, said wrapper class enabling said tool component to interact with a current environment selectively for storing, retrieving and deleting said resource components;
wherein said tool component is independent of the environment in which said resource component is stored.

16. The method of claim 15, including the further step of recursively instantiating a plurality of resource components.

17. The method of claim 15 wherein said step of instantiating a tool component includes instantiating a walker component for traversing a hierarchal structure of nodes; a tool internal component for processing nodes traversed by said walker component; and a builder component for generating said code.

18. A program storage device readable by a machine, tangibly embodying a program of instructions executable by a machine to perform method steps for building a code generation tooling framework, said method steps comprising:

providing a resource component, said resource component representing information shared between components;

providing a tool component, said tool component having a reference to said resource component, said tool component comprising code generating objects for generating code from markup language meta data; and providing a repository component separate from said resource component and from said tool component, said repository component having a reference to said resource component and comprising a wrapper class and a plurality of repository implementations, each repository implementation corresponding to a respective environment, said wrapper class enabling said tool component to interact with a current environment selectively for storing, retrieving and deleting said resource components;

wherein said tool component is independent of the environment in which said resource component is stored.

19. The program storage device of claim 18 wherein said method steps further include a step of recursively providing a plurality of resource components.

20. The program storage device of claim 18 wherein said step of providing a tool component comprises providing a walker component for traversing a hierarchal structure of nodes;

providing a tool internal component for processing nodes traversed by said walker component; and providing a builder component for generating said code.

21. An article of manufacture comprising:

a computer useable medium having computer readable program code means embodied therein for generating code, the computer readable program means in said article of manufacture comprising:

computer readable program code means for causing a computer to effect executing a traverse description method including a node argument and a tool internal argument against a walker object;

computer readable program code means for causing a computer to effect operating said walker object responsive to said traverse description method to selectively call first methods, second methods and third methods;

said first methods including:

invoking a tool internal method for preprocessing on a first node;

operating said tool internal object to invoke a begin to build method against said first node to execute any required preprocessing by said first node on said builder object;

said second methods including:

invoking said tool internal method to perform processing of said first node;

operating said tool internal object to invoke a build to method to execute processing by said first node on said builder object;

said third methods including:

invoking said tool internal method to perform post processing of said first node;

operating said tool internal object to invoke an end build to method to execute any post processing by said first node needed on said builder object.

22. The article of manufacture of claim 21 wherein said article of manufacture executes against a hierarchy of nodes that comprises said first node and at least one child node that itself comprises computer readable program code means for causing a computer to effect executing said first, second, and third methods in turn with respect to each said child node.

23. The article of manufacture of claim 22 wherein each said node is a DOM element node.

24. A computer program product embodied as a plurality of instructions recorded on computer readable media for building a code generation tooling framework according to the steps of:

providing a resource component, said resource component representing information shared between components;

providing a tool component having a reference to said resource component, said tool component comprising at least one object for generating code from data in said resource component; and providing a repository component separate from said resource component and from said tool component, said repository component having a reference to said resource component, said repository component comprising a wrapper class and a plurality of repository implementations, each repository implementation corresponding to a respective environment, said wrapper class enabling said tool component to interact with a current environment selectively for storing, retrieving, and deleting said resource component;

wherein said tool component is independent of the environment in which said resource component is stored.

25. The computer program product of claim 24, said resource component selectively including an encapsulation of data and of meta-data that is needed or consumed by said tool component, said resource component being retrieved or stored by said repository component.

26. The computer program product of claim 25, said resource component comprising a plurality of recursively generated resource components with data required by said tool instance being conveyed through one instantiation of said resource component.

27. The computer program product of claim 25, said resource component implementing a resource interface, said resource interface comprising methods for:

returning contents of said resource component;

returning a resource that is a dependent; and returning the description of said resource component.

28. The computer program product of claim 27, said resource interface further comprising methods for:

creating a resource component that can be used as a dependent;

returning the type of said resource component;

returning the location of said resource component;

setting the contents of said resource component to a specified argument;

setting said resource component to be a dependent; and setting said description to a specified resource argument.

29. The computer program product of claim 24, said tool component comprising an object for generating code from markup language meta data.

30. The computer program product of claim 24, said tool component further comprising:

a walker component for traversing a hierarchal structure of nodes;

a tool internal component for processing nodes traversed by said walker component; and a builder component for generating said code.

31. The computer program product of claim 30, said tool internal component being selectively operable for processing said nodes by performing the function accessed in a dictionary structure or by invoking methods implemented by said tool node.

32. The computer program product of claim 30, further comprising a plurality of chained builder components for generating an overall class from a plurality of objects selectively including arrays and inner classes.

33. The computer program product of claim 30, said tool component further comprising a description node builder component associated with each node in said hierarchal structure for rendering said tool internal component and said builder component independent of said nodes.

* * * * *